United States Patent
Ikeda et al.

(10) Patent No.: US 6,930,410 B2
(45) Date of Patent: Aug. 16, 2005

(54) MOBILE RECEPTACLE, POWER FEEDING GATE DEVICE, SERVER DEVICE AND POWER USAGE MANAGEMENT SYSTEM FOR EFFICIENTLY DELIVERING ELECTRIC POWER

(75) Inventors: Masakazu Ikeda, Kyoto (JP); Masashi Shiomi, Ueno (JP)

(73) Assignee: Sharp Kabushiki Kaisha, Osaka (JP)

( * ) Notice: Subject to any disclaimer, the term of this patent is extended or adjusted under 35 U.S.C. 154(b) by 497 days.

(21) Appl. No.: 10/131,097

(22) Filed: Apr. 25, 2002

(65) Prior Publication Data

US 2002/0158749 A1 Oct. 31, 2002

(30) Foreign Application Priority Data

Apr. 27, 2001 (JP) ........................................ 2001-131547

(51) Int. Cl.[7] ................................................ H01H 3/26
(52) U.S. Cl. ...................... 307/140; 320/109; 320/104; 235/281; 307/9.1
(58) Field of Search ................................ 320/109, 104; 235/381; 307/140, 9.1

(56) References Cited

U.S. PATENT DOCUMENTS

| | | | | |
|---|---|---|---|---|
| 4,532,418 A | * | 7/1985 | Meese et al. ................ | 235/381 |
| 5,299,265 A | * | 3/1994 | Hayama et al. ................ | 381/86 |
| 5,327,066 A | * | 7/1994 | Smith .......................... | 320/109 |
| 5,711,648 A | * | 1/1998 | Hammerslag ................ | 414/800 |

FOREIGN PATENT DOCUMENTS

| JP | 3061831 | 6/1999 |
|---|---|---|
| JP | 2000-123246 | 4/2000 |

* cited by examiner

Primary Examiner—Robert L. DeBeradinis
(74) Attorney, Agent, or Firm—Birch, Stewart, Kolasch & Birch, LLP

(57) ABSTRACT

A power usage management system includes, in order to efficiently distribute electric power, a power feeding gate device supplied with electric power from a power line and controlling supply of electric power based on a key code, a server system transmitting a key code corresponding to identification information for identifying the power feeding gate device, and a mobile receptacle attachable/detachable to/from the power feeding gate device, receiving identification information from the power feeding gate device, receiving the key code corresponding to the identification information from the server system, and providing the key code to the power feeding gate device.

20 Claims, 12 Drawing Sheets

FIG. 6

INFORMATION ABOUT POWER FEEDING GATE DEVICE

/ 34

| ID | KEY CODE | INSTALLATION SITE | MOBILE RECEPTACLE ID | USAGE START TIME | USAGE FINISH TIME | POWER USAGE AMOUNT | FAULT INFORMATION | NUMBER OF USAGE TIMES |
|---|---|---|---|---|---|---|---|---|
| ○○○ | ×××  | △△△ | ◇◇× ○○○ ※※※ | ※※※ ○○○ ※※※ | △△△ ☆☆☆ ◇◇◇ | △△△ ☆☆☆ ◇◇◇ | ▲▲▲ | ▲▲▲ |
| ⋮ | ⋮ | ⋮ | ⋮ | ⋮ | ⋮ | ⋮ | ⋮ | ⋮ |

FIG. 7

INFORMATION ABOUT MOBILE RECEPTACLE

35

| ID | USER | VALUE INDICATED BY INTEGRATING METER AT USAGE START | USAGE START TIME | VALUE INDICATED BY INTEGRATING METER AT USAGE FINISH | USAGE FINISH TIME | ID CODE OF USED POWER FEEDING GATE DEVICE | AMOUNT OF USED POWER | POWER USAGE FEE | ACCOUNT |
|---|---|---|---|---|---|---|---|---|---|
| ○○○ | ×✕× | △△△ ☆☆☆ ◇◇◇ | ✱✱✱ ☆☆☆ ☐☐☐ | ◇◇◇ ○○○ ✱✱✱ | ○○○ ☆☆☆ ◇◇◇ | △△△ ☆☆☆ ◇◇◇ | ✱✱✱ ○○○ ✱✱✱ | ☐☐ ☆☆☆ ◇◇◇ | ▲▲▲ |
| ⋮ | ⋮ | ⋮ | ⋮ | ⋮ | ⋮ | ⋮ | ⋮ | ⋮ | ⋮ |

MOBILE RECEPTACLE, POWER FEEDING GATE DEVICE, SERVER DEVICE AND POWER USAGE MANAGEMENT SYSTEM FOR EFFICIENTLY DELIVERING ELECTRIC POWER

BACKGROUND OF THE INVENTION

1. Field of the Invention

The present invention relates to a mobile receptacle, an electric-power feeding gate device, a server device and an electric-power usage management system. In particular, the invention relates to a mobile receptacle, an electric-power feeding gate device, a server device and an electric-power usage management system for supplying electric power to household electrical appliances.

2. Description of the Background Art

Japanese Utility Model Registration No. 3,061,831 discloses a coin-operated locker for vending electric power. This locker is used for electrically charging, anywhere away from home, such mobile equipment as a personal computer, an electronic notepad, a portable stereo player with a headphone and a cellular telephone, without the risk of theft of the equipment.

Japanese Patent Laying-Open No. 2000-123246 discloses an electric power vending machine for electrically charging a cellular phone conveniently at any place away from home, without the need for an AC feeder line.

In addition, a portable power generator has been known that uses a portable gasoline engine for example.

In consideration of the issue of security, the location where the power vending locker is installed is limited to well-trafficked places where a locker-keeper attends, resulting in the need for the labor cost of the keeper. Moreover, if a certain shop or store owns and manages the locker, the locker is unavailable after the shop or store is closed.

The power vending locker dispenses electric power only when the locker is closed. This means that the locker can be used for only those products that are chargeable and small enough to be held within the locker. Thus, the locker cannot be used for charging electric vehicles that are now becoming pervasive or motor-assisted bicycles. Further, since the power can be delivered only when the locker is closed, it is impossible to electrically charge such electric appliances as portable television and refrigerator that are used at a campsite for example.

There is a problem with the locker for vending electric power and the power vending machine for charging a cellular phone. Specifically, this problem is that the locker and machine can only be used when the user has ready cash at hand.

Further, the locations where the power vending locker and power vending machine for charging a cellular phone are installed are often found away or remote from electric mains (power lines on power poles). Therefore, a long line is necessary for drawing electric power to such installations, or large electric power cannot be supplied to the installations when there are some branches at midpoints of the mains.

With regard to the portable generator using the gasoline engine for example, if the generator is used for a long-term camping for example, the campsite is limited to any place where refueling is available at a gas station or the like. Further, the heavy generator and fuel are inappropriate for portable use. In addition, the flammable gasoline used as a fuel is inappropriate for portable use and storage.

A further problem with the portable generator using gasoline engine for example is that the generator produces noise and exhaust gas.

Although electric vehicles are expected to become widespread in the future, there are currently few places where electric vehicles can readily be charged when the electric vehicles run out of fuel on the way. Full-charging of currently-developed electric vehicles generally takes the whole night, however, the fully-charged electric vehicles can travel approximately 200 km at most, which is extremely shorter than that of gasoline-powered and diesel-powered automobiles. If the battery of the electric vehicle is increased in size for the purpose of achieving a longer travelling distance, the greater battery results in a longer charging time and increase in the weight and size of the body. Consequently, many problems arise such as deterioration of the energy efficiency and increase in cost.

Regarding the conventional power distribution grid (system), the state of electric power usage can be examined for only the total amount of used power measured at a power feeding source (electric power plant) and thus it is impossible to examine the state of power usage on the basis of area or time. Then, it is difficult to distribute power according to the amount of used power, causing an unbalance between supply and demand which hinders enhancement of the power usage efficiency.

SUMMARY OF THE INVENTION

The present invention is made to solve the above-described problems. One object of the invention is to provide a mobile receptacle, a power feeding gate device, a server device and a power usage management system by which electric power can efficiently be delivered.

Another object of the present invention is to provide a mobile receptacle, a power feeding gate device, a server device and a power usage management system by which a fee or rate for the amount of used electric power can automatically be charged.

Still another object of the present invention is to provide a mobile receptacle, a power feeding gate device, a server device and a power usage management system by which an amount of used electric power can be monitored on the basis of the place or period of power usage for efficiently delivering electric power.

According to one aspect of the present invention, a mobile receptacle is attachable/detachable to/from a power feeding gate device which is supplied with electric power from a power line and which has a switch turned on/off to control power-on and power-off based on a key code. The mobile receptacle communicates information with a server device. The mobile receptacle includes an identification information acquiring unit to acquire, from the power feeding gate device to which the mobile receptacle is attached, identification information about the power feeding gate device, an identification information transmitting unit connected to the identification information acquiring unit to transmit to the server device the acquired identification information about the power feeding gate device, a key code receiving unit to receive from the server device a key code corresponding to the identification information about the power feeding gate device for turning on the switch, and a key code output unit connected to the key code receiving unit to output the received key code to the power feeding gate device.

The identification information about the power feeding gate device is obtained from the power feeding gate device to which the mobile receptacle is attached. In return for the identification information, the key code is provided from the server device. This key code is transmitted to the power feeding gate device and accordingly power becomes available. Thus, the user at any place away from home can easily use the electric power by attaching the mobile receptacle to the power feeding gate device.

According to another aspect of the present invention, a power feeding gate device supplies electric power from a power line to an attachable/detachable mobile receptacle. The power feeding gate device includes a switch turned on/off according to whether electric power is supplied to the mobile receptacle or not, a key code acquiring unit to acquire, from the mobile receptacle to which the power feeding gate device is attached, a key code for turning on the switch, and a control unit connected to the switch and the key code acquiring unit to control turning on/off of the switch based on the acquired key code.

Whether or not electric power is fed to the mobile receptacle is determined based on the key code acquired from the mobile receptacle.

According to still another aspect of the present invention, a server device communicates information with a mobile receptacle attached to a power feeding gate device which is supplied with electric power from a power line and which has a switch. The server device includes a first storage unit to store a key code per identification information about the power feeding gate device, the key code being used for turning on the switch, a receiving unit to receive from the mobile receptacle the identification information for identifying the power feeding gate device, an extracting unit to extract the key code stored in the first storage unit based on the identification information about the power feeding gate device received by the receiving unit, and a transmitting unit to transmit the key code extracted by the extracting unit to the mobile receptacle.

The server device receives the identification information about the power feeding gate device from the mobile receptacle, and then transmits the key code corresponding to that identification information to the mobile receptacle. Accordingly, usage of power by mobile receptacle becomes possible.

According to a further aspect of the present invention, a power usage management system includes a power feeding gate device supplied with electric power from a power line and controlling supply of electric power based on a key code, a server device transmitting the key code corresponding to identification information for identifying the power feeding gate device, and a mobile receptacle attachable/detachable to/from the power feeding gate device, receiving the identification information from the power feeding gate device, receiving the key code corresponding to the identification information from the server device, and providing the key code to the power feeding gate device.

The mobile receptacle receives from the server device the key code corresponding to the identification information about the power feeding gate device to which the mobile receptacle is attached. Then, the mobile receptacle provides the key code to the power feeding gate device. Based on the key code, power feeding gate device determines whether it supplies power or not. In this way, the user can obtain and use electric power in a simplified manner.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 shows information regarding the power feeding gate device that is stored in a storage unit.

FIG. 7 shows information regarding the mobile receptacle that is stored in a storage unit.

DESCRIPTION OF THE PREFERRED EMBODIMENTS

One embodiment of the present invention is applied herein for example to charging of an electric vehicle and accordingly described below.

<Entire Structure of the System>

Figure 1:
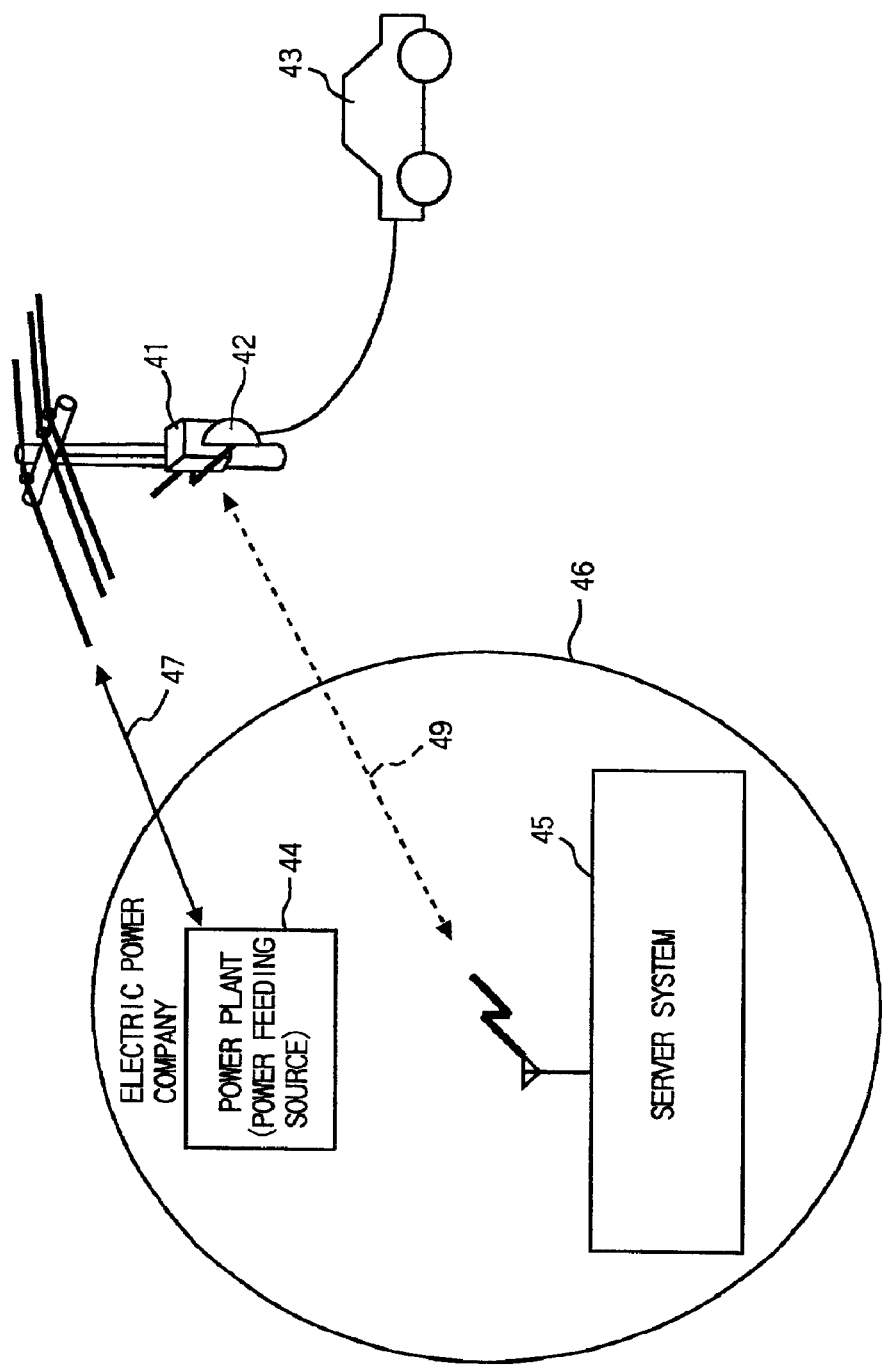
FIG. 1 externally shows a power usage management system.
Figure 2:
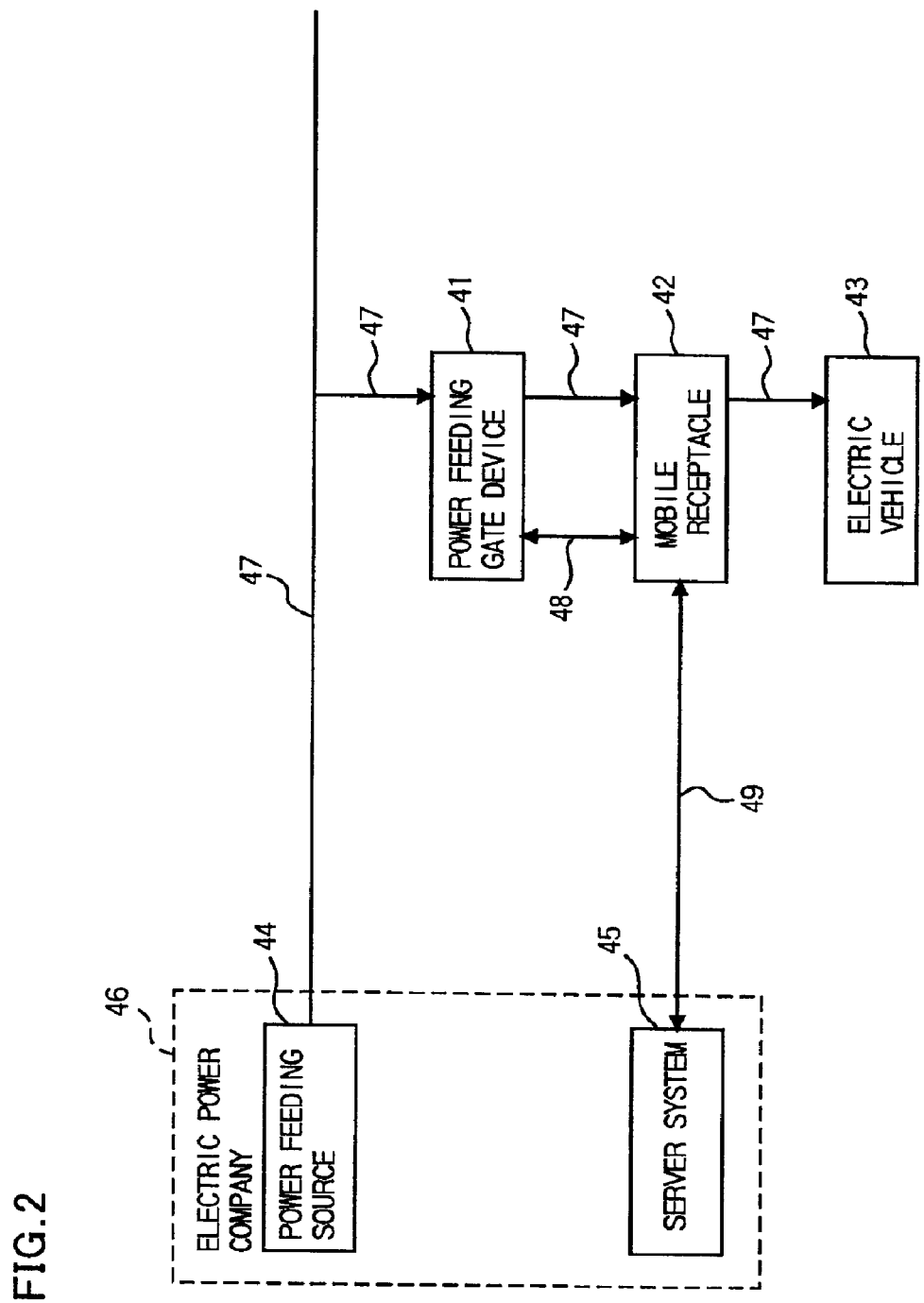
FIG. 2 is a block diagram showing a hardware configuration of the power usage management system.

Referring to FIGS. 1 and 2, a power usage management system includes a power plant (power feeding source) 44, a power line 47 for conveying electric power generated by power feeding source 44, a power feeding gate device 41 connected to power line 47 for controlling the amount of power, a mobile receptacle 42 which is portable and connected to power feeding gate device 41 through power line 47 and a communication line 48 when electric power is used, and a server system 45 of an electric power company that is connected to mobile receptacle 42 through a communication line 49 which is of radio communication, for example, for managing the state of usage of the electric power as well as monetary charging information. To mobile receptacle 42, electric-power-driven equipment or machine such as an electric vehicle 43 for example is connected, and accordingly electric power is fed to electric vehicle 43.

Electric power company 46 includes power feeding source 44 and server system 45.

Communication line 48 is used for transmitting signals between power feeding gate device 41 and mobile receptacle 42 for using electric power.

Communication line 49 is used for transmitting information about usage of power, for example, between mobile receptacle 42 and server system 45. Communication line 49 may be such a wire as telephone line, power line or optical fiber by which two-way communication is possible.

<Mobile Receptacle>

Figure 3:
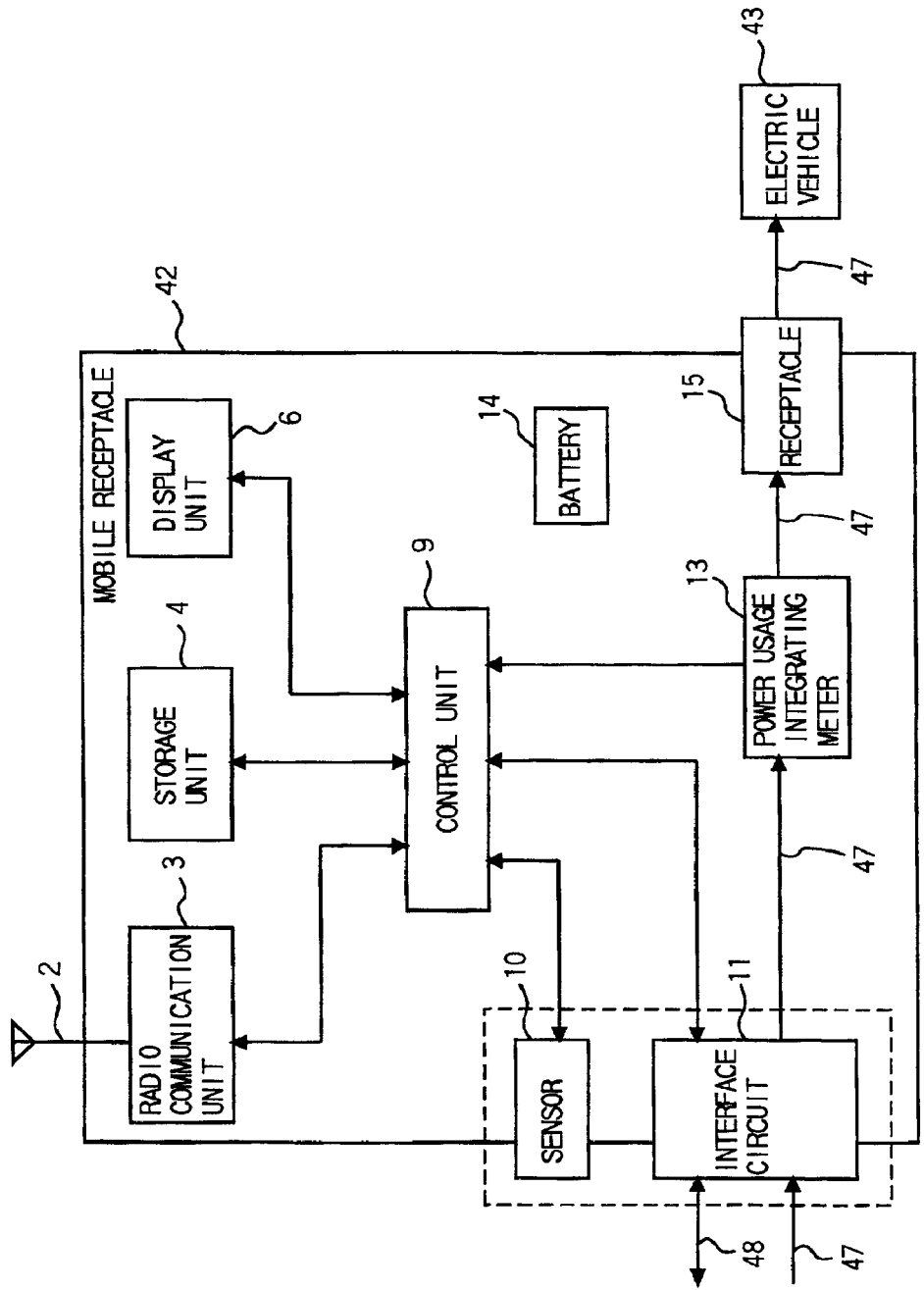
FIG. 3 is a block diagram showing a hardware configuration of a mobile receptacle.

Referring to FIG. 3, mobile receptacle 42 includes an antenna 2, a radio communication unit 3 connected to antenna 2 for radio communication between antenna 2 and electric power company 46, a storage unit 4 for storing various types of information, an interface circuit 11 connected to power feeding gate device 41 through power line 47 and communication line 48 for transmitting and receiving power and signals between mobile receptacle 42 and power feeding gate device 41, a power usage integrating meter 13 connected to interface circuit 11 for measuring the amount of electric power used by electric vehicle 43, and a receptacle 15 connected to integrating meter 13 for supplying electric power to electric vehicle 43.

Mobile receptacle 42 further includes a battery 14 storing electric power used for driving components of mobile receptacle 42, a sensor 10 detecting connection of mobile receptacle 42 to power feeding gate device 41, a display unit 6 showing information regarding whether or not mobile receptacle 42 can be used, a period of time for which the mobile receptacle is used, and the amount of used power, for example, and a control unit 9 connected to radio communication unit 3, storage unit 4, display unit 6, sensor 10, interface circuit 11 and integrating meter 13 for generally controlling each of the components.

Storage unit 4 stores an ID code of mobile receptacle 42, an ID request signal of power feeding gate device 41 that is necessary for using power feeding gate device 41, a key code request signal of power feeding gate device 41 that is necessary for using power feeding gate device 41, a specified value (upper limit) of the number of times a retry request is made to electric power company 46 for a key code of power feeding gate device 41 when a key code of power feeding gate device 41 does not match a code transmitted from mobile receptacle 42, a gate device unavailability signal transmitted to electric power company 46 when power feeding gate device 41 cannot be used, and a usage finish notification signal for informing electric power company 46 of the end of power usage.

Storage unit 4 temporarily stores an ID code of power feeding gate device 41, a key code request signal of power feeding gate device 41 that is transmitted from power feeding gate device 41 when a key code of power feeding gate device 41 does not match a code transmitted from mobile receptacle 42 and a retry request is made to electric power company 46 for a key code of power feeding gate device 41, and a retry number which is the number of times a retry request is made to electric power company 46 for a key code of power feeding gate device 41 when a key code of power feeding gate device 41 does not match a code transmitted from mobile receptacle 42.

Mobile receptacle 42 may conduct wire communication with electric power company 46. In this case, a wire communication unit is employed instead of radio communication unit 3.

<Power Feeding Gate Device>

Figure 4:
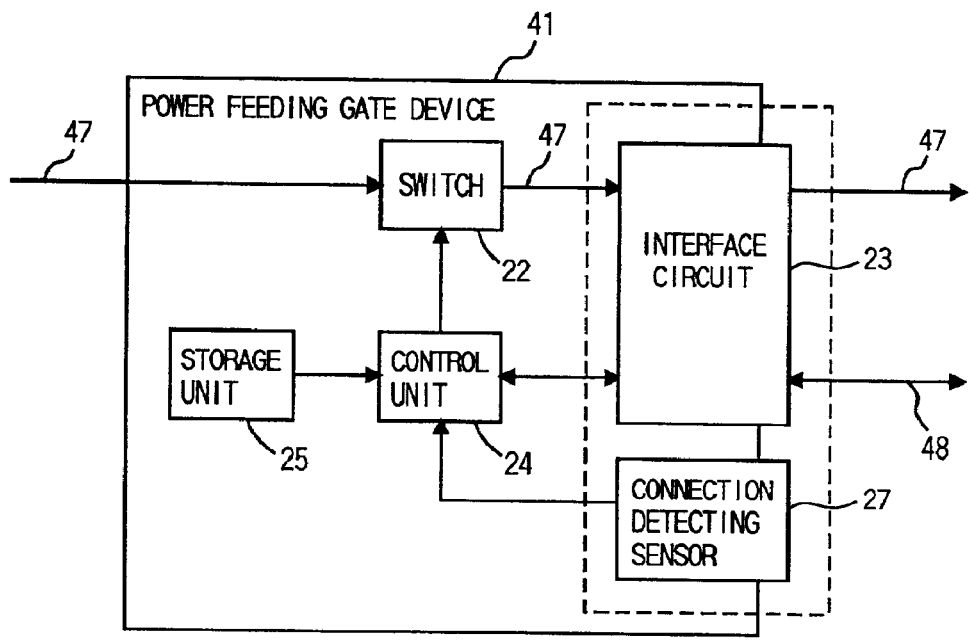
FIG. 4 is a block diagram showing a hardware configuration of a power feeding gate device.

Referring to FIG. 4, power feeding gate device 41 includes a switch 22 connected to power line 47 for limiting transmission of power, which is fed from electric power company 46, to mobile receptacle 42, an interface circuit 23 for transmitting control signals and electric power between power feeding gate device 41 and mobile receptacle 42, and a sensor (connection detecting sensor) 27 for detecting connection of mobile receptacle 42 to power feeding gate device 41.

Power feeding gate device 41 further includes a storage unit 25 for storing ID code specific to power feeding gate device 41, a key code for turning switch 22 on for using power, a key code request signal for requesting a key code to turn on switch 22 for using power, and a usage start notification signal indicating that switch 22 is turned on, and includes a control unit 24 connected to switch 22, interface circuit 23, storage unit 25 and connection detecting sensor 27 for generally controlling each of the components.

<Server System 45 of Electric Power Company 46>

Figure 5:
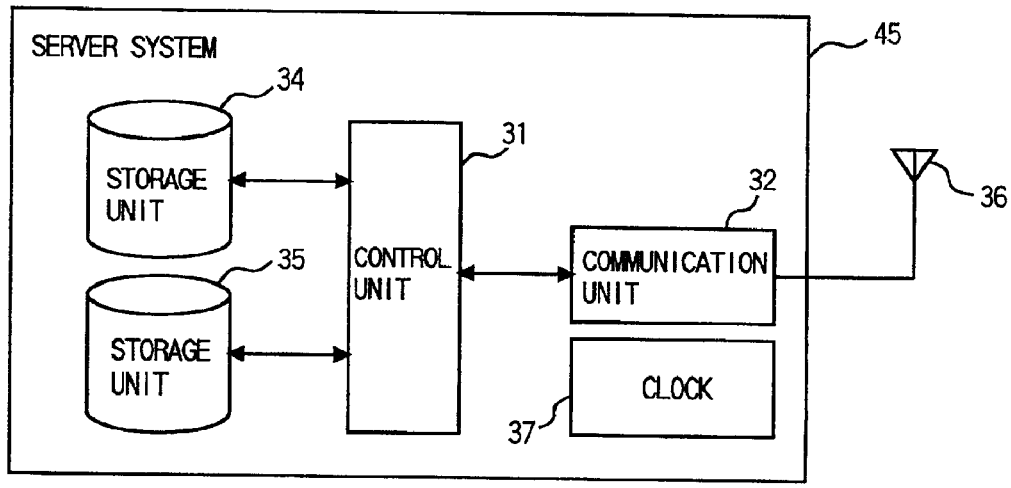
FIG. 5 is a block diagram showing a hardware configuration of a server system.

Referring to FIG. 5, server system 45 of electric power company 46 includes a storage unit 34 storing information concerning the power feeding gate device, a storage unit 35 storing information concerning the mobile receptacle, an antenna 36, a radio communication unit 32 connected to antenna 36 for communication between server system 45 of electric power company 46 and mobile receptacle 42, a clock 37 for managing a period of time during which power feeding gate device 41 is used, and a control unit 31 connected to radio communication unit 32 and storage units 34 and 35 for generally controlling each of the components.

Wired communication may be conducted between server system 45 and the mobile receptacle. In this case, a wire communication unit is used instead of radio communication unit 32.

Referring to FIG. 6, storage unit 34 stores ID code information specific to power feeding gate device 41, key code information associated with each power feeding gate device 41 for controlling switch 22 of power feeding gate device 41, installation site indicating where power feeding gate device 41 is installed, ID information of mobile receptacle 42 that uses power feeding gate device 41, usage start time indicating when a user starts using power feeding device 41, usage finish time indicating when the user finishes using power feeding gate device 41, a power usage amount indicating how much the user uses power supplied from power feeding gate device 41, fault information indicating record of fault of power feeding gate device 41, and usage time information indicating the number of times mobile receptacle 42 uses power feeding gate device 41.

The ID code information, key code information and installation site are registered in advance by an electric power management company when electric power company 46 installs power feeding gate device 41.

Referring to FIG. 7, storage unit 35 stores ID code information specific to mobile receptacle 42, user information associated with mobile receptacle 42 (information about the address, name, contact address for example of a user), a value indicated by power usage integrating meter 13 of mobile receptacle 42 when the user starts using power feeding gate device 41, usage start time of power feeding gate device 41, a value of power usage integrating meter 13 of mobile receptacle when the user finishes using power feeding gate device 41, usage finish time of power feeding gate device 41, an ID code of power feeding gate device 41 utilized by the user, an amount of power used by the user, a fee for the amount of used power, and information about an account of the user in order for electric power company 46 to collect the usage fee from the user.

In the power management company, the ID code information, user information and the information about the account of the user are registered in advance when the user arranges for usage of the system.

A person in charge in electric power company 46 is informed of occurrence of fault from the fault information of power feeding gate device 41 to locate the site of installation of failed power feeding gate device 41 according to the installation site information of power feeding gate device 41. After this, the person in charge in electric power company 46 or a member of a maintenance company repairs the failed power feeding gate device 41.

Referring to FIGS. 8–12, an operation of the power usage management system is now described.

Figure 8:
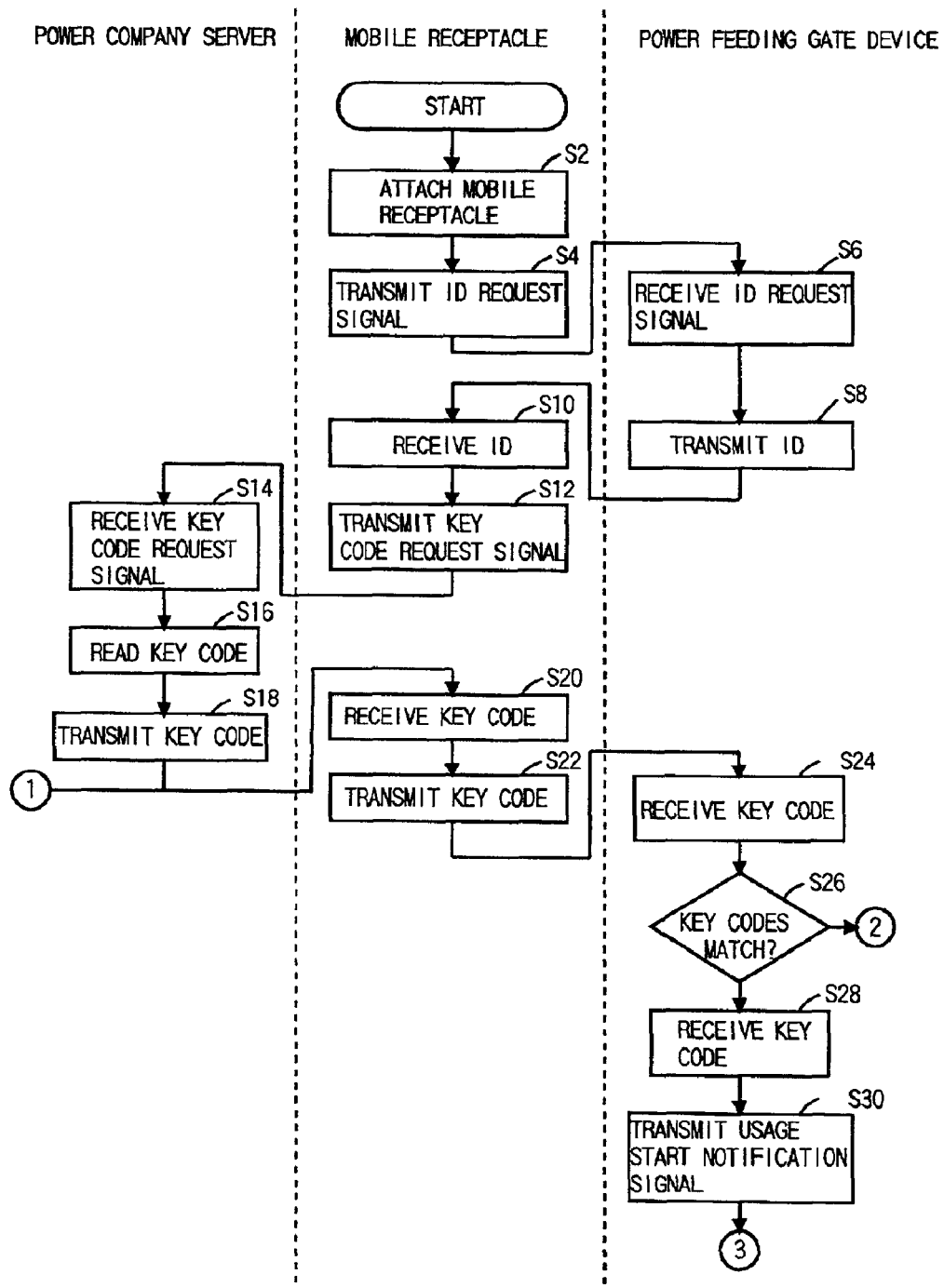
FIGS. 8–12 show a flowchart illustrating an operation of the power usage management system.

Referring to FIG. 8, a user attaches mobile receptacle 42 to interface circuit 23 of power feeding gate device 41 for electrically charging electric vehicle 43 (S2).

Sensor 10 of mobile receptacle 42 detects whether or not mobile receptacle 42 is connected to power feeding gate device 41. A resultant detection signal is input to control unit 9. Control unit 9 detects the detection signal to read an ID code request signal of power feeding gate device 41 that is stored in storage unit 4, and transmits the ID code request signal to power feeding gate device 41 through interface circuit 11 (S4).

Power feeding gate device 41 receives the ID request signal of power feeding gate device 41 from mobile receptacle 42 through communication line 48 and interface circuit 23 (S6). This ID request signal is input to control unit 24. Control unit 24 reads ID code of power feeding gate device 41 that is stored in storage unit 25, and transmits the ID code to mobile receptacle 42 through interface circuit 23 with respect to mobile receptacle 42 and through communication line 48 for communication with mobile receptacle 42 (S8).

A signal including the ID code of power feeding gate device 41 is provided from power feeding gate device 41 to interface circuit 11 of mobile receptacle 42 (S10), and that signal is transmitted to control unit 9. In response to the signal, control unit 9 reads ID code of mobile receptacle 42 and the key code request signal of power feeding gate device 41 for turning switch 22 on that are stored in storage unit 4. Control unit 9 transmits, to radio communication unit 3, the ID code of power feeding gate device 41, the ID code of mobile receptacle 42, and the key code request signal of power feeding gate device 41 for turning switch 22 on. Radio communication unit 3 converts the signal from control unit 9 into radio wave which is accordingly radiated from antenna 2. The signal from antenna 2 is transmitted to the electric power company (S12).

Communication unit 32 in server system 45 of electric power company 46 receives from mobile receptacle 42 the ID code of power feeding gate device 41, the ID code of mobile receptacle 42, and the key code request signal for turning on switch 22 of power feeding gate device 41 (S14), and transmits the signal to control unit 31. Control unit 31 reads, from storage unit 34 storing information about power feeding gate device 41, a key code for turning on switch 22 of power feeding gate device 41 corresponding to the ID code of power feeding gate device 41, and transmits the key code to communication unit 32 (S16). Communication unit 32 then transmits the key code back to mobile receptacle 42. (S18).

Radio communication unit 3 of mobile receptacle 42 receives a signal including the key code of power feeding gate device 41 from electric power company 46, and converts the signal into an electric signal which is transmitted to control unit 9 (S20). Control unit 9 receives and then transmits the key code signal of power feeding gate device 41 to power feeding gate device 41 through interface circuit 11 (S22).

Figure 10:
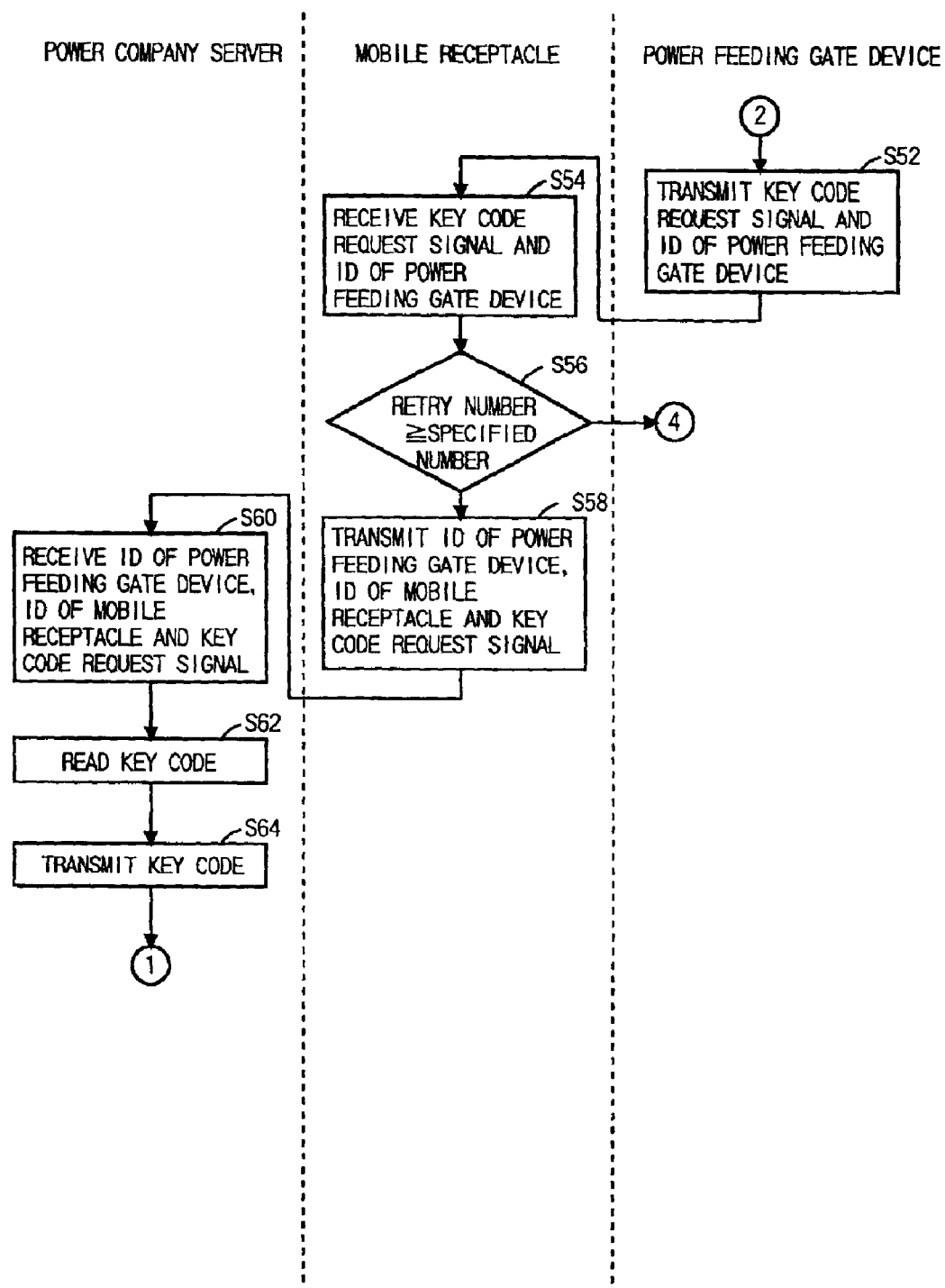

Interface circuit 23 of power feeding gate device 41 receives, from mobile receptacle 42 through communication line 48 and interface circuit 23, the key code for turning on switch 22 of power feeding gate device 41 and inputs the signal to control unit 24 (S24). Control unit 24 reads a key code of power feeding gate device 41 stored in storage unit 25 and compares the read key code with the key code provided from mobile receptacle 42 (S26). If these key codes do not match (NO in S26), a retry process is carried out as shown in FIG. 10 and the subsequent drawing and described later. If the key codes match (YES in S26), control unit 24 transmits the signal to switch 22 for turning on switch 22. In response to this signal, switch 22 is turned on (S28). Control unit 24 transmits a signal indicating that switch 22 is made on (usage start notification signal) to mobile receptacle 42 through interface circuit 23 and communication line 48. At this time, power is output to interface circuit 23 with respect to mobile receptacle 42 (S30).

Figure 9:
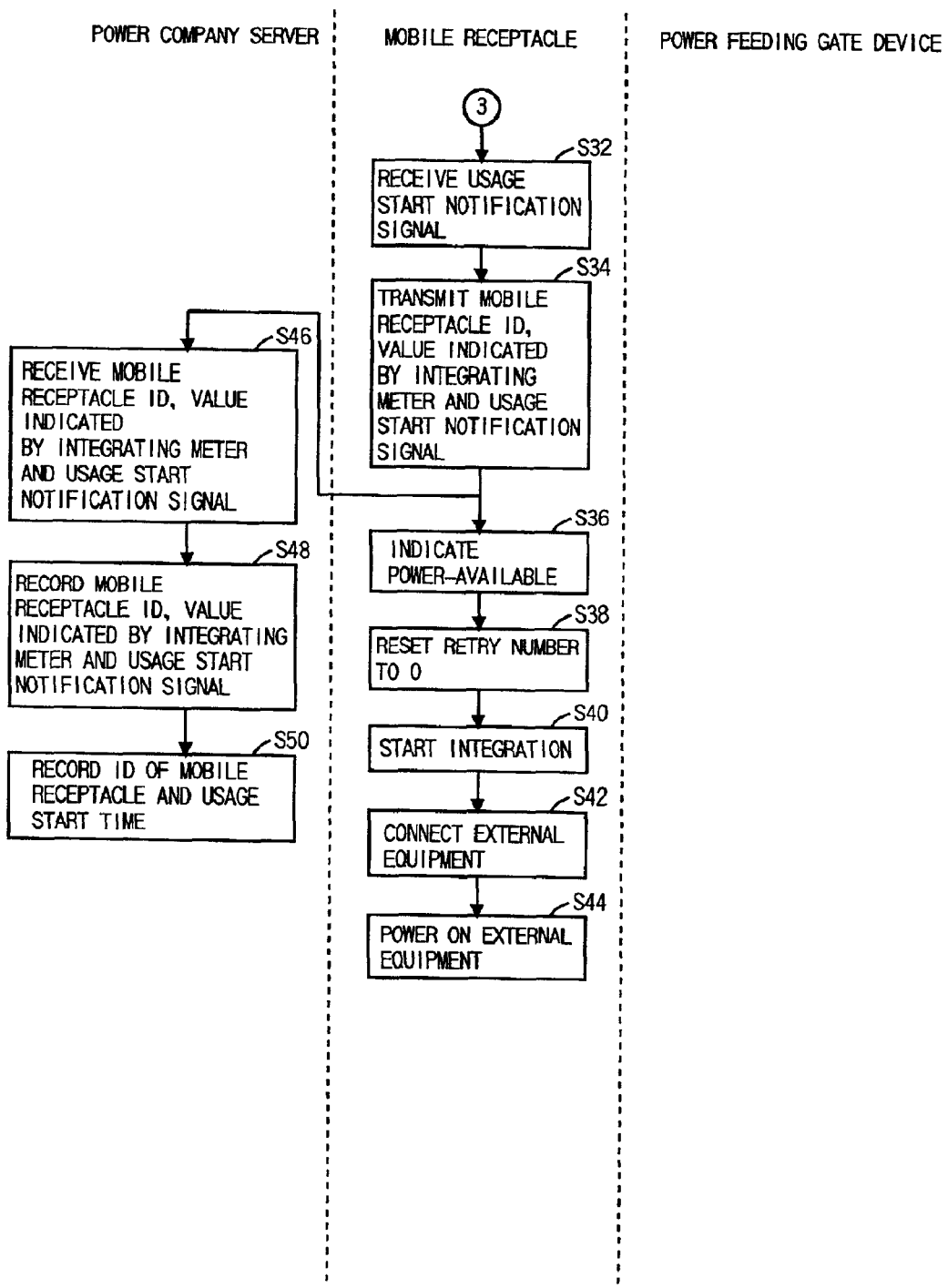

Referring to FIG. 9, interface circuit 11 of mobile receptacle 42 receives the usage start notification signal from power feeding gate device 41, and the signal is transmitted to control unit 9 (S32). Control unit 9 receives the usage start notification signal to read the ID code of mobile receptacle 42 that is stored in storage unit 4 and a value indicated by power usage integrating meter 13. Control unit 9 provides the usage start notification signal, ID code of mobile receptacle 42 and the value indicated by power usage integrating meter 13 to radio communication unit 3. Radio communication unit 3 converts the signal received from control unit 9 into radio wave which is accordingly radiated from antenna 2. The signal radiated from antenna 2 is transmitted to electric power company 46 (S34).

Further, control unit 9 receives the usage start notification signal to show on display unit 6 that electric power is now available (S36). Control unit 9 further resets, to zero, the number of times a retry is made that is stored in storage unit 4 (S38). Power usage integrating meter 13 calculates the integral of the amount of used power (S40). Then, an external equipment (e.g. charging plug of electric vehicle 43) is connected to receptacle 15 (S42), and accordingly power becomes available when the external equipment is powered on (S44).

After the step S34, communication unit 32 in server system 45 of electric power company 46 receives the ID code of mobile receptacle 42, the value indicated by the power usage integrating meter included in mobile receptacle 42 and the usage start notification signal that are provided from mobile receptacle 42, and then transmits them to control unit 31 (S46). Control unit 31 stores, in a relevant area of storage unit 35 storing information about mobile receptacle 42, the value indicated by power usage integrating meter 13 included in mobile receptacle 42. Control unit 31 reads the time indicated by clock 37 and stores the time as usage start time of power feeding gate device 41 in storage unit 35.

Control unit 31 records in a relevant area of storage unit 35 storing information about mobile receptacle 42, ID code of power feeding gate device 41 to be used (S48). Control unit 31 records the ID code of mobile receptacle 42 and the usage start time in a relevant area for power feeding gate device 41 in storage unit 34 storing information about power feeding gate device 41 (S50).

Referring back to FIG. 8, if the key code of power feeding gate device 41 that is stored in storage unit 25 do not match the key code transmitted from mobile receptacle 42 (NO in S26), a retry process is carried out.

Referring to FIG. 10, the retry process is described.

Control unit 24 of power feeding gate device 41 reads the key code request signal and ID code of power feeding gate device 41 that are stored in storage unit 25 and transmits them to mobile receptacle 42 through interface circuit 23 and communication line 48 (S52).

Interface circuit 11 of mobile receptacle 42 receives the key code request signal and ID code of power feeding gate device 41 and transmits this information to control unit 9 (S54). Control unit 9 temporarily stores the information in storage unit 4. Control unit 9 determines whether the number of times the retry request is made (retry number) exceeds a specified number stored in storage unit 4 (S56). Control unit 9 adds 1 to the retry number stored in storage unit 4 for updating the retry number which is accordingly stored in storage unit 4. Control unit 9 thereafter compares the updated retry number with the upper limit of the retry number which is also stored in storage unit 4.

If the retry number is equal to or greater than the upper limit of the retry number (YES in S56), which means that power is unavailable. Then, the subsequent process is carried out that is shown in FIG. 11 and described later.

If the retry number is smaller than the upper limit (NO in S56), control unit 9 transmits, to radio communication unit 3, the key code request signal of power feeding gate device 41 and respective ID codes of mobile receptacle 42 and power feeding gate device 41 that have already been stored in storage unit 4. Radio communication unit 3 converts the signal from control unit 9 into radio wave which is accordingly radiated from antenna 2. The signal sent from antenna 2 is transmitted to electric power company 46 (S58).

Communication unit 32 of server system 45 receives, from mobile receptacle 42, the ID code of mobile receptacle 42, the ID code of power feeding gate device 41, and the key code request signal of power feeding gate device 41, and transmits the signal to control unit 31 (S60). Control unit 31 reads from storage unit 34 which stores information about power feeding gate device 41, a key code for turning switch 22 on that corresponds to the ID code of power feeding gate device 41, and transmits the key code to communication unit 32 (S62). Communication unit 32 sends the key code in return to mobile receptacle 42 (S64). After this, a process is carried out that is the same as the process starting from step S20 of FIG. 8, which is performed when mobile receptacle 42 receives the key code of power feeding gate device 41 from server system 45 of electric power company 46.

Figure 11:
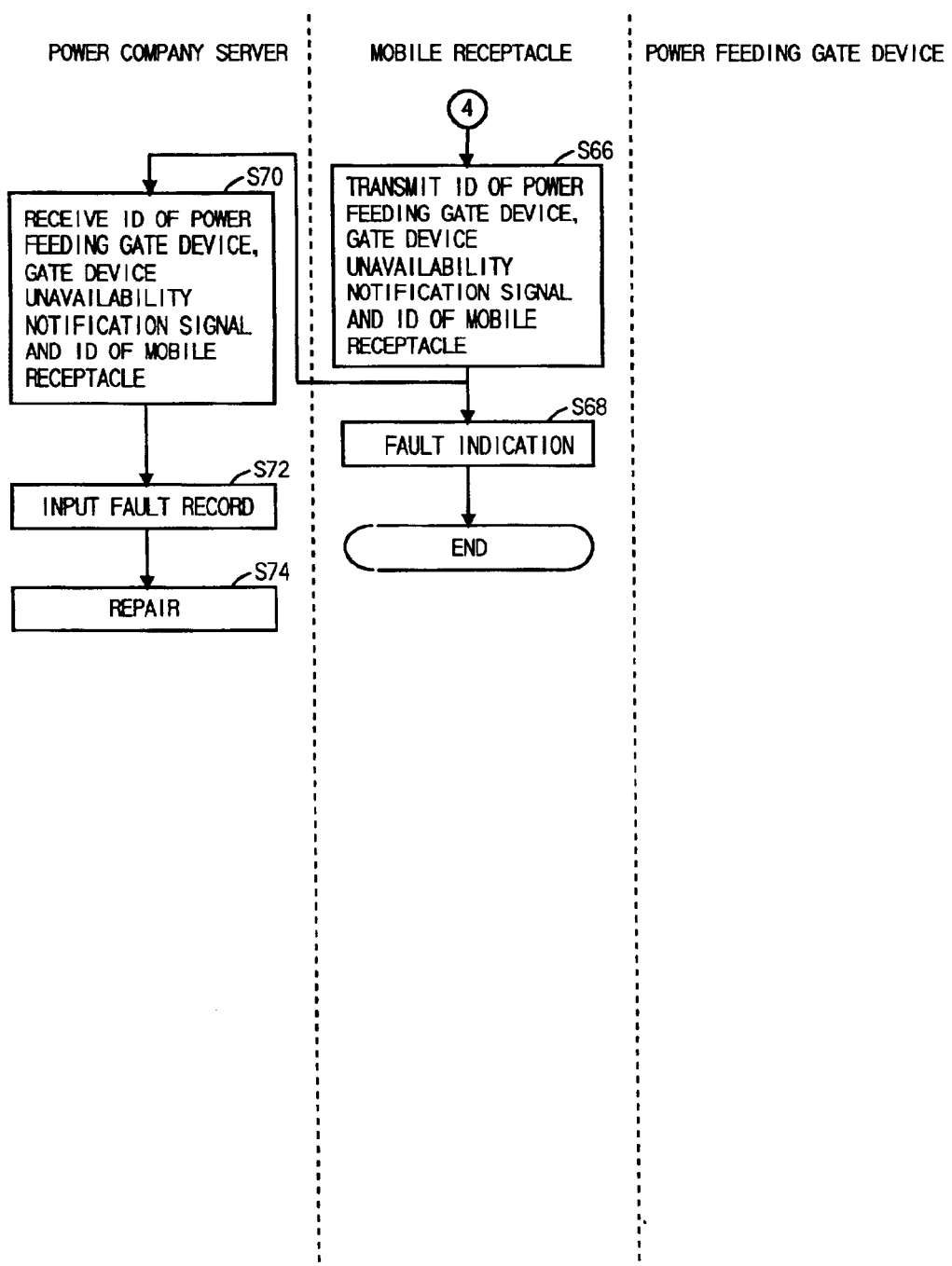

Referring to FIG. 11, if the retry number is equal to or greater than the upper limit of retry number (YES in S56), a process is carried out which is the same as that performed when mobile receptacle 42 determines that power feeding gate device 41 is unavailable. More specifically, control unit 9 of mobile receptacle 42 transmits, to radio communication unit 3, the ID code of power feeding gate device 41 which is temporarily stored in storage unit 4, the unavailability signal (indicating that power feeding gate device 41 cannot be used) that is stored in advance in storage unit 4, and the ID code of mobile receptacle 42 stored in storage unit 4. Radio communication unit 3 converts the signal from control unit 9 into radio wave which is accordingly radiated from antenna 2. The signal from antenna 2 is transmitted to electric power company 46 (S66). Control unit 9 shows on display unit 6 that power feeding gate device 41 is unavailable (S68) to finish using power feeding gate device 41.

Communication unit 32 in server system 45 of electric power company 46 receives the ID code of power feeding gate device 41, the signal for informing that power feeding gate device 41 is unavailable, and the ID code signal of mobile receptacle 42, and transmits the signal and codes to control unit 31 (S70). Control unit 31 records occurrence of fault as fault information stored in storage unit 34 which stores information about power feeding gate device 41 (S72). A person in charge in power company 46 checks the fault information in system maintenance to effect repair for the fault (S74).

Figure 12:
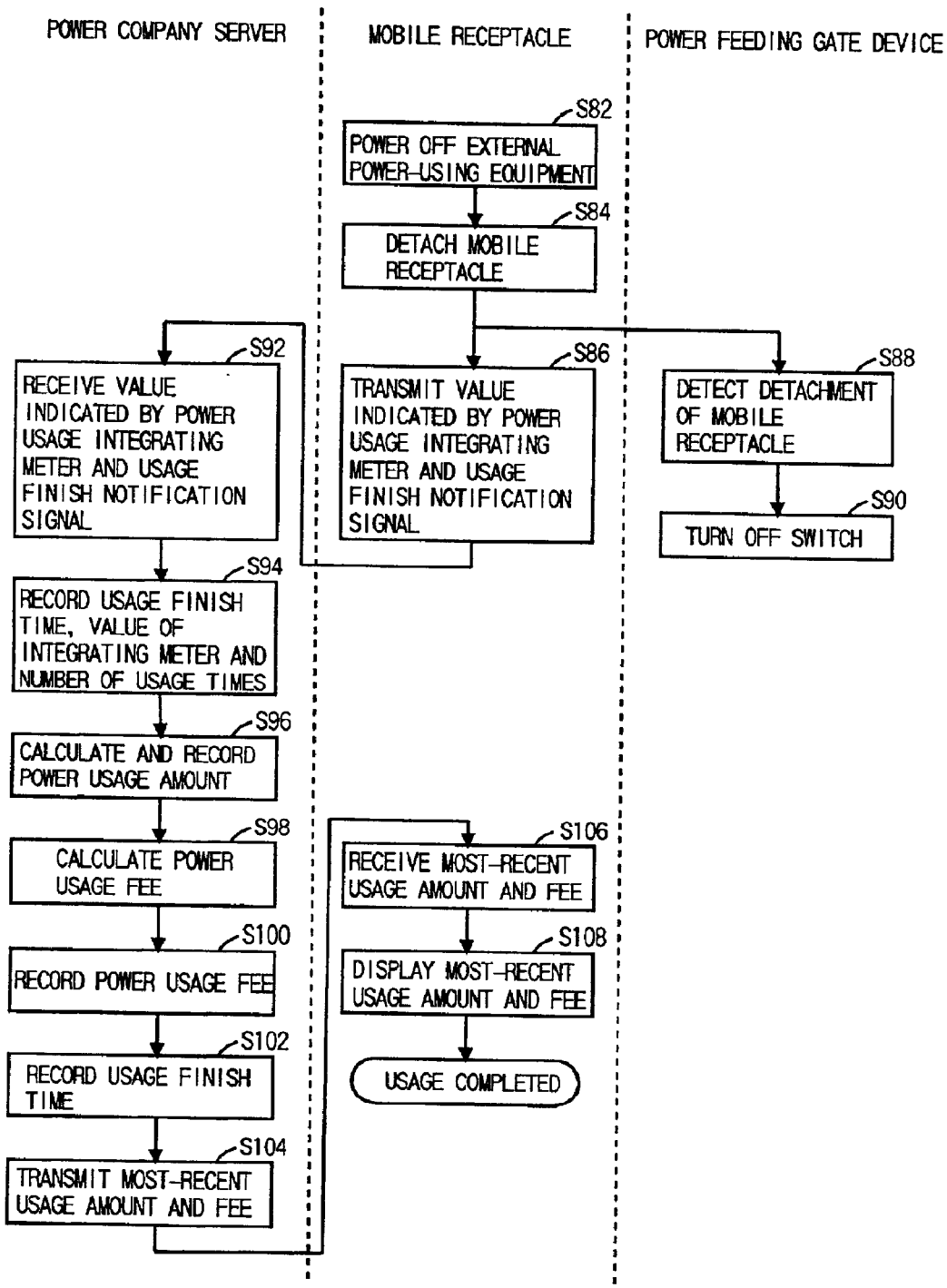

Referring to FIG. 12, when external equipment or machine, for example, electric vehicle 43 finishes using the electric power and accordingly mobile receptacle 42 is detached from power feeding gate device 41, an operation is carried out as described below.

When the usage of power is finished, a user powers off the external equipment (S82) and detaches mobile receptacle 42 from power feeding gate device 41 (S84). Then, a signal indicating that mobile receptacle 42 is detached from power feeding gate device 41 is transmitted from sensor 10 of power feeding gate device 41 to control unit 9. In response to this signal, control unit 9 transmits to radio communication unit 3 a value measured by power usage integrating meter 13, the ID code of mobile receptacle 42 stored in storage unit 4, and the usage finish notification signal stored in advance in storage unit 4. Radio communication unit 3 converts the signal received from control unit 9 into radio wave which is accordingly radiated from antenna 2. The signal from antenna 2 is transmitted to power company 46 (S86).

After the step S84 of detaching mobile receptacle 42 from power feeding gate device 41, a signal indicating the detachment of mobile receptacle 42 from power feeding gate device 41 is sent from connection detecting sensor 27 contained in power feeding gate device 41 to control unit 24 (S88). Control unit 24 thus receives this signal to turn switch 22 off (S90). Accordingly, supply of electric power to interface circuit 23 is stopped.

On the other hand, after the step S86, communication unit 32 in server system 45 of electric power company 46 receives the ID code of mobile receptacle 42, the value measured by the power usage integrating meter contained in mobile receptacle 42 and the usage finish notification signal and transmits them to control unit 31 (S92).

Control unit 31 reads the time indicated by clock 37 to store the time, as the time when usage of power feeding gate device 41 is finished, in storage unit 35, and then increases by one the number of times power feeding gate device 41 is used that is stored in storage unit 35. The value indicated at the usage finish time (when usage of power feeding gate device 41 is finished) by the power usage integrating meter contained in mobile receptacle 42 is then recorded in storage unit 35 (S94).

Control unit 31 subtracts, from the value at the usage finish time, the value at the usage start time (when usage of power feeding gate device 41 is started) that is indicated by power usage integrating meter contained in mobile receptacle 42, in order to determine the amount of used power. This power amount is recorded in both of the area of power usage amount of mobile receptacle 42 in storage unit 35 and the area of power usage amount of power feeding gate device 41 (S96). Control unit 31 determines a fee for this amount of used power (S98) and records this fee in the area of power fee of mobile receptacle 42 in storage unit 35 (S100).

Control unit 31 records the time when it receives the usage finish notification signal in storage unit 34, specifically in the area of usage finish time of power feeding gate device 41 (S102). Control unit 31 transmits the power usage fee and the power usage amount to communication unit 32. Communication unit 32 transmits the power usage amount and the power usage fee to mobile receptacle 42 (S104).

Radio communication unit 3 of mobile receptacle 42 thus receives the signal representing the power usage amount and the power usage fee from electric power company 46 through antenna 2, and this signal is input to radio communication unit 3 (S106). Radio communication unit 3 converts the signal to an electric signal which is transmitted to control unit 9. Control unit 9 thus shows the received power usage amount and the power usage fee on display unit 6 (S108) and the user finishes using this system.

Figure 13:
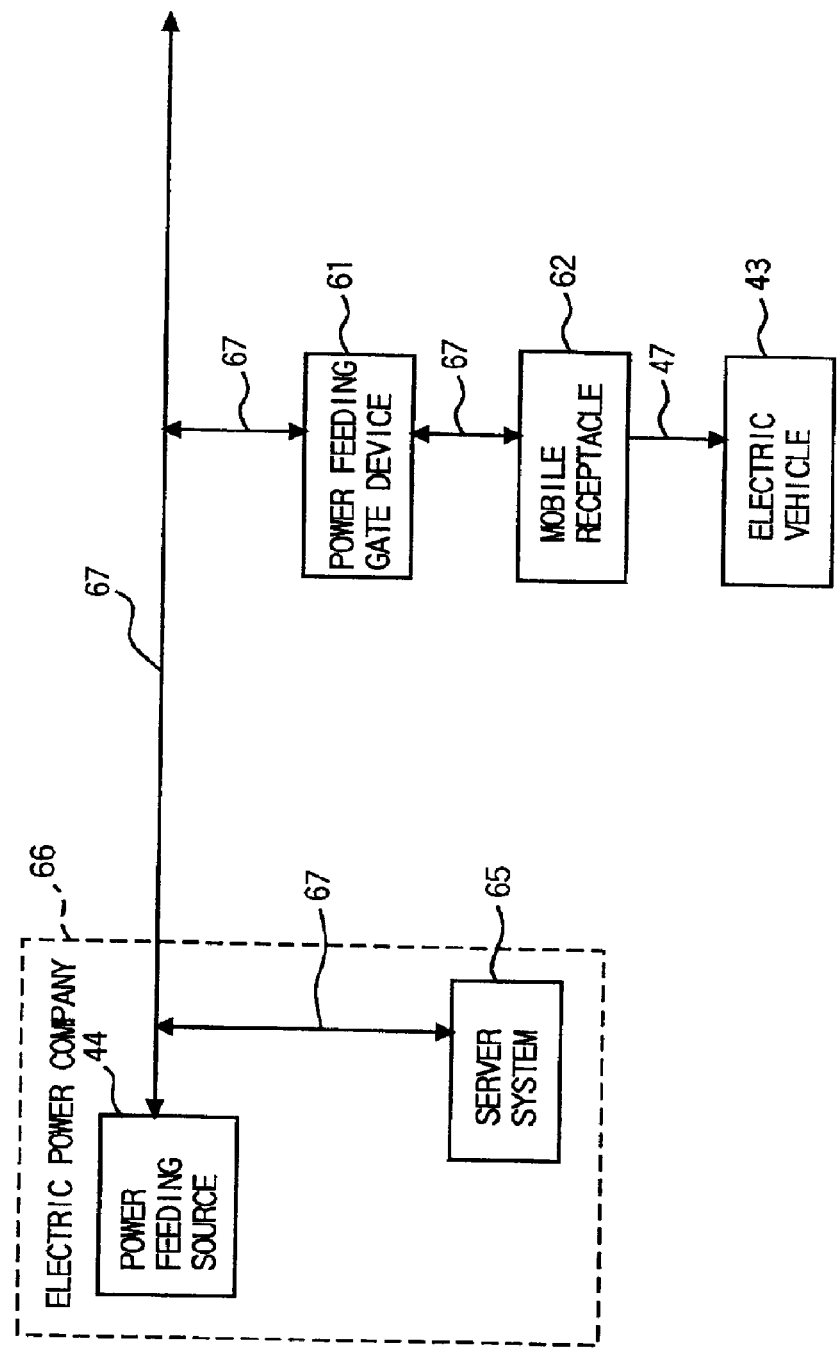
FIG. 13 is a block diagram showing a hardware configuration of the power usage management system.

Referring to FIG. 13, the power usage management system may employ a power line 67 through which signals can be transmitted, instead of the communication line and power line. Specifically, by means of power line 67, mobile receptacle 42 and power feeding gate device 41, power feeding gate device 41 and power feeding source 44, and power feeding gate device 41 and server system 45 are connected.

According to the description above, radio communication unit 3, power usage integrating unit 13 and receptacle 15 are provided within mobile receptacle 42. However, these components may be provided within power feeding gate device 41.

The ID code of mobile receptacle 42, and the value indicated by power usage integrating meter 13 provided within mobile receptacle 42 may be transmitted to power company 46 at regular intervals. In this case, if such a signal is not transmitted to power company 46 within the interval, power company 46 accordingly determines that any fault occurs in mobile receptacle 42. Then, power company 46 calculates the power usage fee by using any value indicated by power usage integrating meter 13 that the power company receives last.

Instead of using power usage integrating meter 13, the fee for using mobile receptacle 42 may be determined as a flat monthly rate.

It may naturally possible to connect any electric power-driven product other than electric vehicle 43 to mobile receptacle 42.

As discussed above, power feeding gate device 41 has a simple structure and thus can be installed at any place where power line 47 is provided. Power feeding gate device 41 can thus be installed near the power mains to enable the user to obtain large electric power. As power feeding gate device 41 can easily be installed, power feeding gate devices 41 may be placed at an increased number of installation sites. This means that electric vehicle 43 may have its battery reduced in size which accordingly shorten the time required for charging the battery. Then, it is possible to reduce the weight of the body of the vehicle as well as the cost of the vehicle, and accordingly widespread use of electric vehicle 43 is promoted.

Power feeding gate device 41 is placed outside as an AC receptacle, which means that device 41 can be used for charging electric vehicle 43 and which eliminates the above described problems or inconveniences that the electric power can be used only when the power vending locker is closed, and that only those products which is small enough to be held in the power vending locker can be supplied with the power by the locker.

Since radio communication unit 3 transmits information regarding power usage to electric power company 46, the user can utilize the electric power when the user has no cash at hand.

In addition, since there is no need for fuel as required by the power generator using a gasoline engine for example, the problem of noise and exhausted gas is eliminated.

Moreover, based on the installation site of power feeding gate device 41 as well as the status of usage of mobile receptacle 42, the area-based and time-based power usage status can be examined. Then, a power supply line can be established that achieves well-balanced supply and demand.

Further, any person in charge in electric power company 46 can know the frequency of usage according to information about usage history of power feeding gate device 41. For example, in summer, power feeding gate devices 41 are used with greater frequency near seaside resorts and with smaller frequency near ski resorts. On the other hand, in winter, power feeding gate devices 41 are used with greater frequency near ski resorts and with smaller frequency near seaside resorts. Then, according to this information about usage of the devices, the person in charge in electric power company 46 moves power feeding gate devices 41 placed near ski resorts to places near seaside resorts in summer, and moves power feeding gate devices 41 placed near seaside resorts to places near ski resorts in winter. In this way, efficient use of power feeding gate devices 41 that are relatively small in number is possible.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A mobile receptacle attachable/detachable to/from a power feeding gate device supplied with electric power from a power line and having a switch being turned on/off to control power-on and power-off based on a key code, said mobile receptacle communicating information with a server device, comprising:
   an identification information acquiring unit to acquire, from the power feeding gate device to which said mobile receptacle is attached, identification information about said power feeding gate device;
   an identification information transmitting unit connected to said identification information acquiring unit to transmit to said server device the acquired identification information about said power feeding gate device;
   a key code receiving unit to receive from said server device a key code corresponding to the identification information about said power feeding gate device for turning on said switch; and
   a key code output unit connected to said key code receiving unit to output the received key code to said power feeding gate device.

2. The mobile receptacle according to claim 1, further comprising an attachment detecting sensor to detect attachment to said power feeding gate device and output an attachment detection signal, wherein
   said identification information acquiring unit is connected to said attachment detecting sensor and acquires the identification information about said power feeding gate device in response to said attachment detection signal.

3. The mobile receptacle according to claim 2, further comprising a storage unit to store identification information about the mobile receptacle for identifying said mobile receptacle, wherein
   said identification information transmitting unit transmits to said server device the identification information about said mobile receptacle that is stored in said storage unit.

4. The mobile receptacle according to claim 1, further comprising a detachment detecting sensor to detect detachment from said power feeding gate device and output a detachment detection signal, wherein
   said identification information transmitting unit is connected to said detachment detecting sensor and transmits a usage finish notification signal to said server device in response to said detachment detection signal.

5. The mobile receptacle according to claim 1, further comprising:
   a key code request signal receiving unit to receive a key code request signal from said power feeding gate device; and
   a display unit connected to said key code request signal receiving unit to indicate that said mobile receptacle is unavailable when said key code request signal is received a predetermined number of times.

6. The mobile receptacle according to claim 1, further comprising an unavailability signal transmitting unit connected to said key code request signal receiving unit to transmit to said server device an availability signal indicating that said mobile receptacle is unavailable when said key code request signal is received a predetermined number of times.

7. The mobile receptacle according to claim 1, further comprising:
- a supplied power amount measuring unit to measure an amount of supplied power; and
- a supplied power amount transmitting unit connected to said supplied power amount measuring unit to transmit information about said amount of supplied power to said server device.

8. A power feeding gate device supplying electric power from a power line to an attachable/detachable mobile receptacle, comprising:
- an identification information output unit, the mobile receptacle being attached to the power feeding gate device, to output to said mobile receptacle identification information about said power feeding gate device;
- a switch turned on/off according to whether electric power is supplied to said mobile receptacle or not;
- a key code acquiring unit to acquire, from the mobile receptacle to which said power feeding gate device is attached, a key code for turning on said switch; and
- a control unit connected to said switch and said key code acquiring unit to control turning on/off of said switch based on the acquired key code.

9. The power feeding gate device according to claim 8, wherein
said control unit turns on said switch for supplying electric power from the power line to said mobile receptacle when the key code acquired by said key code acquiring unit matches a key code stored in advance.

10. The power feeding gate device according to claim 8, wherein
said control unit includes a key code request signal output unit to output, when said key code acquired by said key code acquiring unit does not match a key code stored in advance, a key code request signal to said mobile receptacle for requesting said mobile receptacle to re-transmit a key code.

11. The power feeding gate device according to claim 8, further comprising:
- an identification information storage unit to store said identification information about the power feeding gate device for identifying said power feeding gate device;
- said identification information output unit connected to said identification information storage unit to output to said mobile receptacle the identification information about said power feeding gate device.

12. The power feeding gate device according to claim 8, further comprising a connection detecting sensor to detect whether said mobile receptacle is attached or not, wherein
said control unit turns off said switch when said mobile receptacle is detached.

13. A server device communicating information with a mobile receptacle attached to a power feeding gate device being supplied with electric power from a power line and having a switch, comprising:
- a first storage unit to store a key code per identification information about the power feeding gate device, said key code being used for turning on said switch;
- a receiving unit to receive from said mobile receptacle the identification information for identifying the power feeding gate device;
- an extracting unit to extract said key code stored in said first storage unit based on the identification information about said power feeding gate device received by said receiving unit; and
- a transmitting unit to transmit said key code extracted by said extracting unit to said mobile receptacle.

14. The server device according to claim 13, further comprising a second storage unit to store an electric power fee per identification information about the mobile receptacle for identifying said mobile receptacle.

15. The server device according to claim 14, further comprising an electric power fee calculating unit to receive, from said mobile receptacle, an amount of supplied electric power to calculate the electric power fee based on said amount of supplied electric power and to write the electric power fee in said second storage unit.

16. The server device according to claim 14, further comprising an electric power fee transmitting unit connected to said electric power fee calculating unit to transmit said electric power fee stored in said second storage unit to said mobile receptacle.

17. The server device according to claim 14, further comprising:
- a usage finish notification signal receiving unit to receive from said mobile receptacle a usage finish notification signal and an amount of supplied electric power when usage of said power feeding gate device is finished; and
- an electric power fee calculating unit connected to said usage finish notification signal receiving unit to calculate an electric power fee based on said amount of supplied electric power and writing the electric power fee in said second storage unit.

18. The server device according to claim 13, further comprising:
- a usage finish notification signal receiving unit to receive from said mobile receptacle a usage finish notification signal when usage of said power feeding gate device is finished; and
- a usage frequency storage unit connected to said usage finish notification signal receiving unit to store, in said first storage unit in response to said usage finish notification signal, the number of times said power feeding gate device is used.

19. The server device according to claim 13, wherein
said first storage unit further stores information about the site where said power feeding gate device is installed, and said server device further comprises:
- an unavailability signal receiving unit to receive from said mobile receptacle an unavailability signal indicating that said mobile receptacle is unavailable when usage of said power feeding gate device is impossible; and
- a fault information storage unit connected to said first storage unit and said unavailability signal receiving unit to store fault information in said first storage unit in response to said unavailability signal.

20. A power usage management system comprising:
- a power feeding gate device supplied with electric power from a power line and controlling supply of electric power based on a key code;
- a server device transmitting the key code corresponding to identification information for identifying said power feeding gate device; and
- a mobile receptacle attachable/detachable to/from said power feeding gate device supplying power from the power feeding gate device to a receptacle, receiving the identification information from said power feeding gate device, receiving the key code corresponding to said identification information from said server device, and providing said key code to said power feeding gate device.

* * * * *